United States Patent [19]

Olgren

[11] Patent Number: 5,787,759
[45] Date of Patent: Aug. 4, 1998

[54] POSITION CONTROL APPARATUS FOR STEERING COLUMN

[75] Inventor: Leland Nels Olgren, Frankenmuth, Mich.

[73] Assignee: General Motors Corporation, Detroit, Mich.

[21] Appl. No.: 799,678

[22] Filed: Feb. 11, 1997

[51] Int. Cl.[6] .................................................... B62D 1/18
[52] U.S. Cl. ............................ 74/493; 74/492; 280/777
[58] Field of Search ........................ 74/493, 492, 497; 280/777

[56] References Cited

U.S. PATENT DOCUMENTS

| | | | |
|---|---|---|---|
| 4,472,982 | 9/1984 | Nishikawa | 74/493 |
| 4,541,298 | 9/1985 | Strutt | 74/493 |
| 4,732,050 | 3/1988 | Vollmer | 74/493 |
| 5,009,120 | 4/1991 | Iseler et al. | 74/493 |
| 5,052,240 | 10/1991 | Miyoshi et al. | 74/493 |
| 5,117,707 | 6/1992 | Kinoshita et al. | 74/493 |
| 5,161,425 | 11/1992 | Baskett et al. | 74/493 |
| 5,199,319 | 4/1993 | Fujiu | 74/493 |
| 5,596,907 | 1/1997 | Barton | 74/493 |
| 5,655,413 | 8/1997 | Barton | 74/493 |

FOREIGN PATENT DOCUMENTS 5-262238 10/1993 Japan.
2295219 5/1996 United Kingdom.

*Primary Examiner*—Charles A. Marmor
*Assistant Examiner*—David M. Fenstermacher
*Attorney, Agent, or Firm*—Saul Schwartz

[57] ABSTRACT

A position control apparatus for an adjustable steering column including a first toothed rack, a cam block shiftable in linear translation toward and away from the first toothed rack, a rack shoe having a second toothed rack thereon mounted on the cam block for linear translation therewith and for pivotal movement relative thereto, and a spring biasing the rack shoe to a tilted position on the cam block. An end tooth of the second toothed rack engages a mating tooth of the first toothed rack when the cam block is advanced toward the first toothed rack. The force reaction of the mating tooth on the end tooth pivots the rack shoe relative to the cam block to a position parallel to the first toothed rack in which the first and the second toothed racks mesh. If a peak of the end tooth meets a peak of the mating tooth, pivotal movement of the rack shoe displaces the peak of the end tooth to a flank of the mating tooth thereby to prevent alignment of the peaks of the teeth on the first and second toothed racks and corresponding interference with smooth mesh between the first and the second toothed racks.

3 Claims, 4 Drawing Sheets

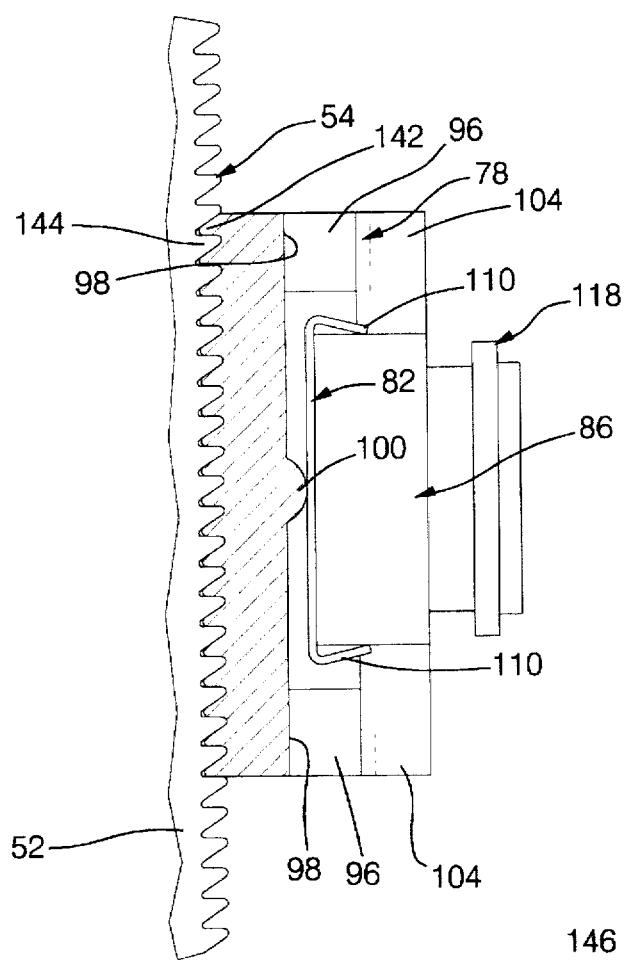
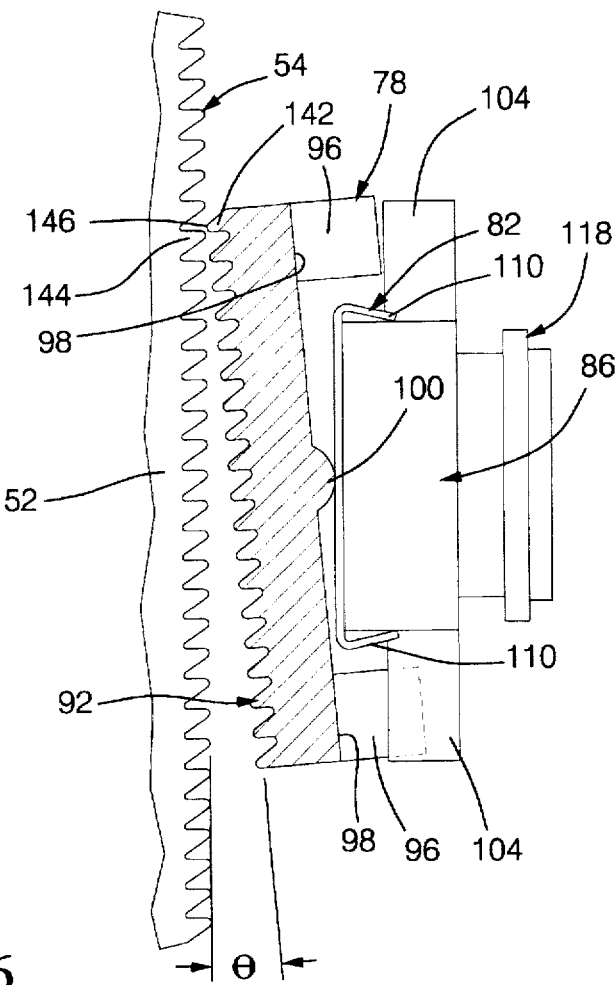
FIG. 5
FIG. 6

5,787,759

1

POSITION CONTROL APPARATUS FOR STEERING COLUMN

TECHNICAL FIELD

This invention relates to a position control apparatus for an adjustable motor vehicle steering column.

BACKGROUND OF THE INVENTION

A motor vehicle steering column commonly includes a tubular mast jacket, a steering shaft rotatably supported on the mast jacket, and a steering wheel on the steering shaft. When the mast jacket is pivotable up and down to adjust the vertical position of the steering wheel, the steering column is characterized as "rake adjustable" or "raked". When the length of the mast jacket can be changed to adjust the horizontal position of the steering wheel, the steering column is characterized as "telescopically adjustable" or "telescopic". Position control apparatuses for raked and/or telescopic steering columns are known in which a pair of vertical sides of a stationary bracket are clamped against the mast jacket by a lever actuated screw or by a lever actuated rotary cam to capture by friction the position of the mast jacket relative to the vehicle body. To maximize the performance of such position control apparatuses under extreme circumstances, e.g., during an impact on the steering wheel, it is further known to form toothed racks on the stationary bracket and on the steering column which mesh when the vertical sides of the stationary bracket are clamped against the mast jacket. In such position control apparatuses, however, the toothed racks may not mesh smoothly in the circumstance of peak-to-peak engagement between teeth on one of the racks and teeth on the other of the racks.

SUMMARY OF THE INVENTION

This invention is a new and improved position control apparatus for an adjustable motor vehicle steering column including a first toothed rack, a cam block shiftable in linear translation toward and away from the first toothed rack, a rack shoe having a second toothed rack thereon mounted on the cam block for linear translation as a unit therewith and for pivotal movement relative thereto, and a spring biasing the rack shoe to a tilted position relative to the cam block. An end tooth of the second toothed rack engages a mating tooth of the first toothed rack when the cam block is advanced in linear translation toward the first toothed rack. The force reaction of the mating tooth on the end tooth pivots the rack shoe relative to the cam block about a centerline on the cam block to a position parallel to the first toothed rack in which the first and the second toothed racks mesh. In the circumstance that a peak of the end tooth meets a peak of the mating tooth, pivotal movement of the rack shoe about the centerline on the cam block displaces the peak of the end tooth to a flank of the mating tooth thereby to prevent alignment of the peaks of the teeth on the first toothed rack with the peaks of the teeth on the second toothed rack and corresponding interference with smooth mesh between the first and the second toothed racks. A preferred embodiment of the position control apparatus includes a first pair of toothed racks to capture the vertical adjustment of the steering column, a second pair of toothed racks to capture the horizontal adjustment of the steering column, and a lever actuated cam means which captures and releases the steering column vertically and horizontally by concurrently meshing and unmeshing the first and the second pairs of toothed racks.

2

Figure 1:
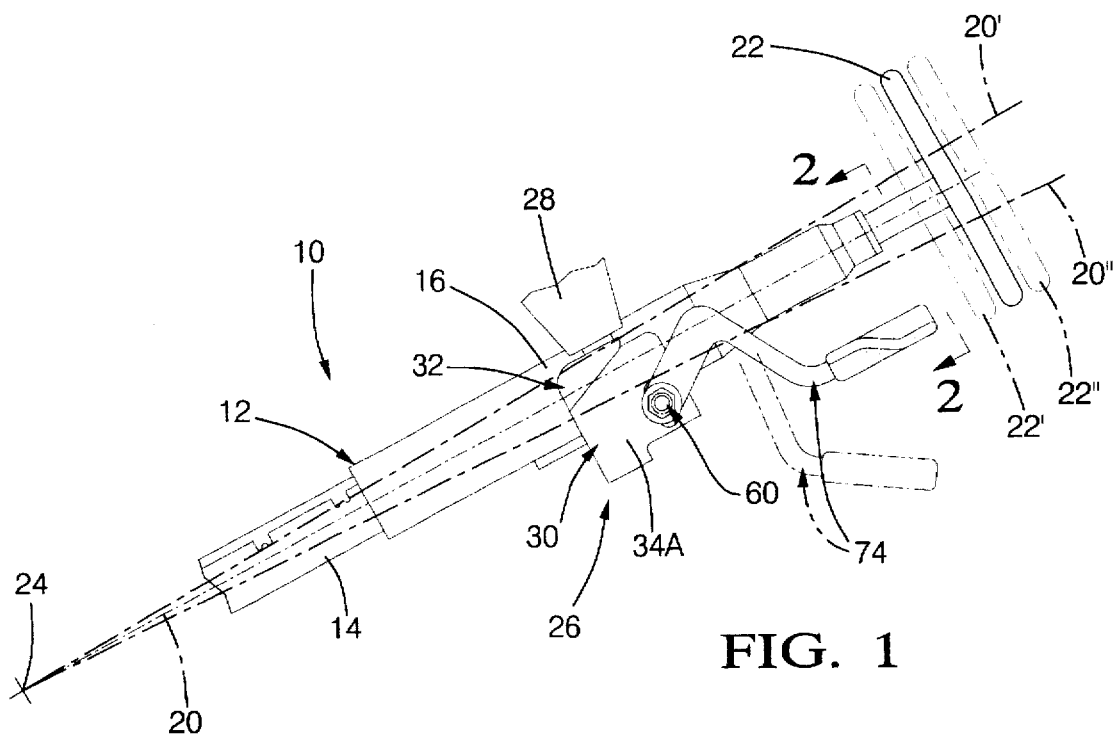
FIG. 1 is a fragmentary elevational view of motor vehicle steering column having a position control apparatus according to this invention.
Figure 2:
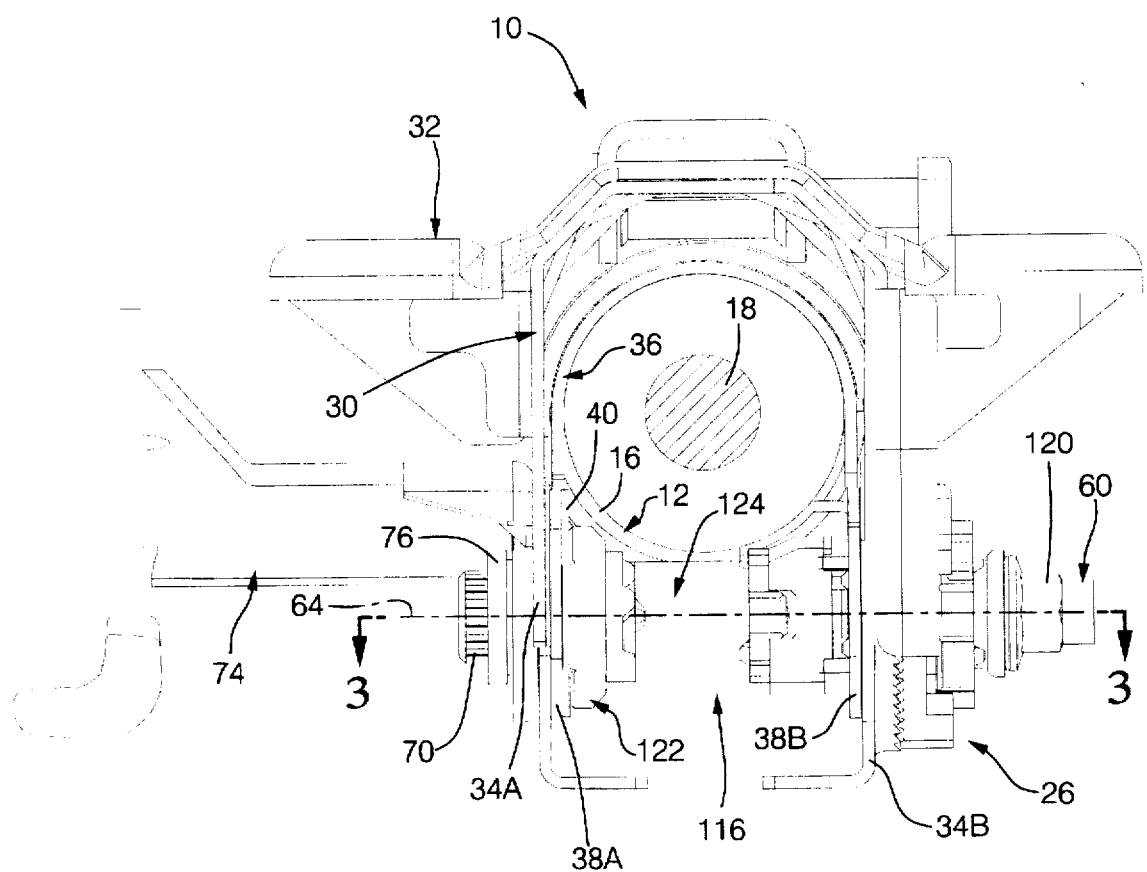
Figure 3:
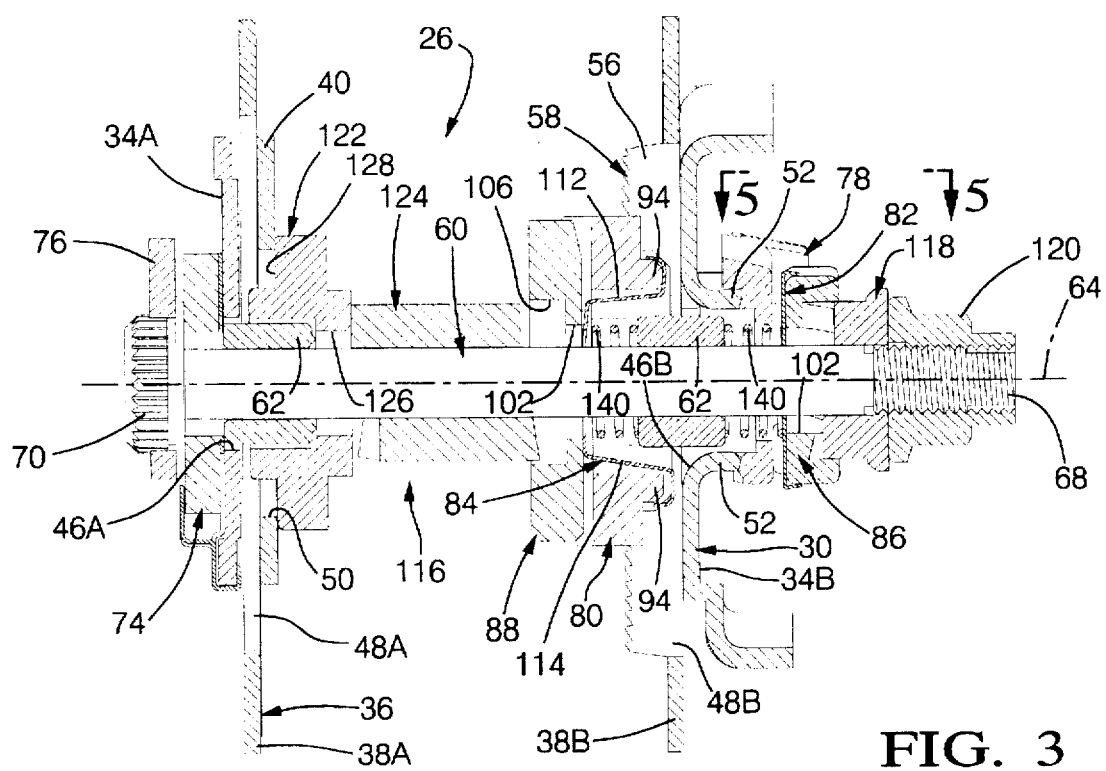
Figure 4:
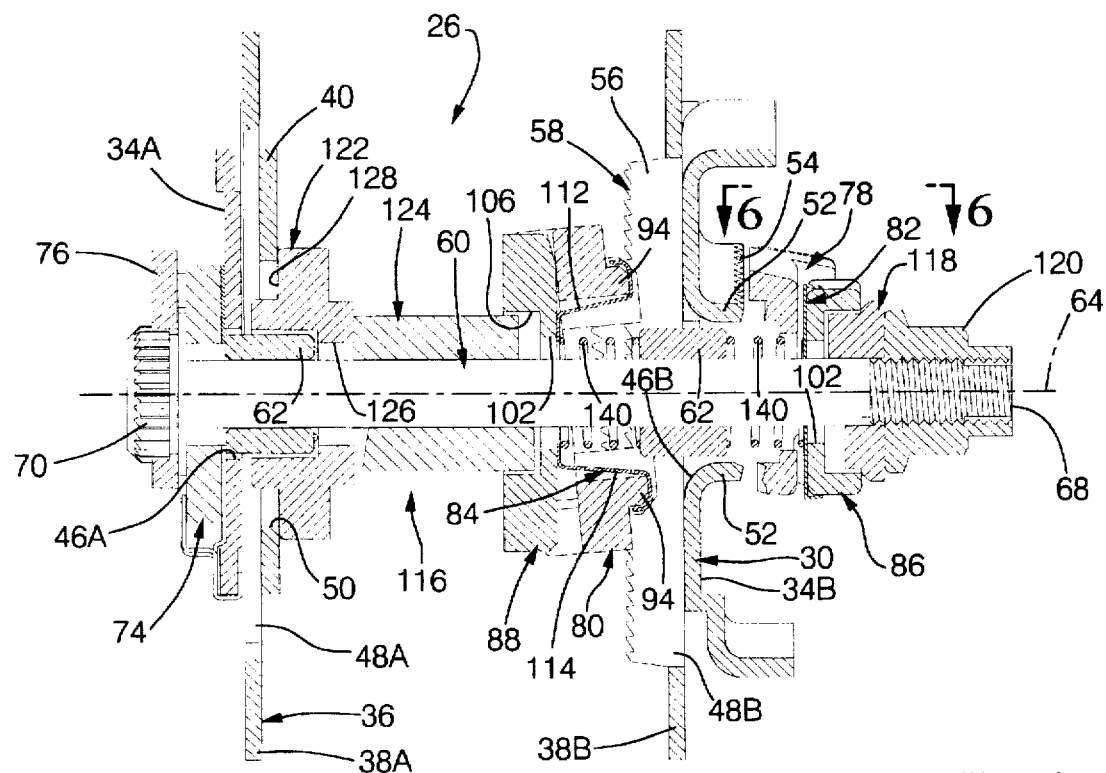
Figure 7:
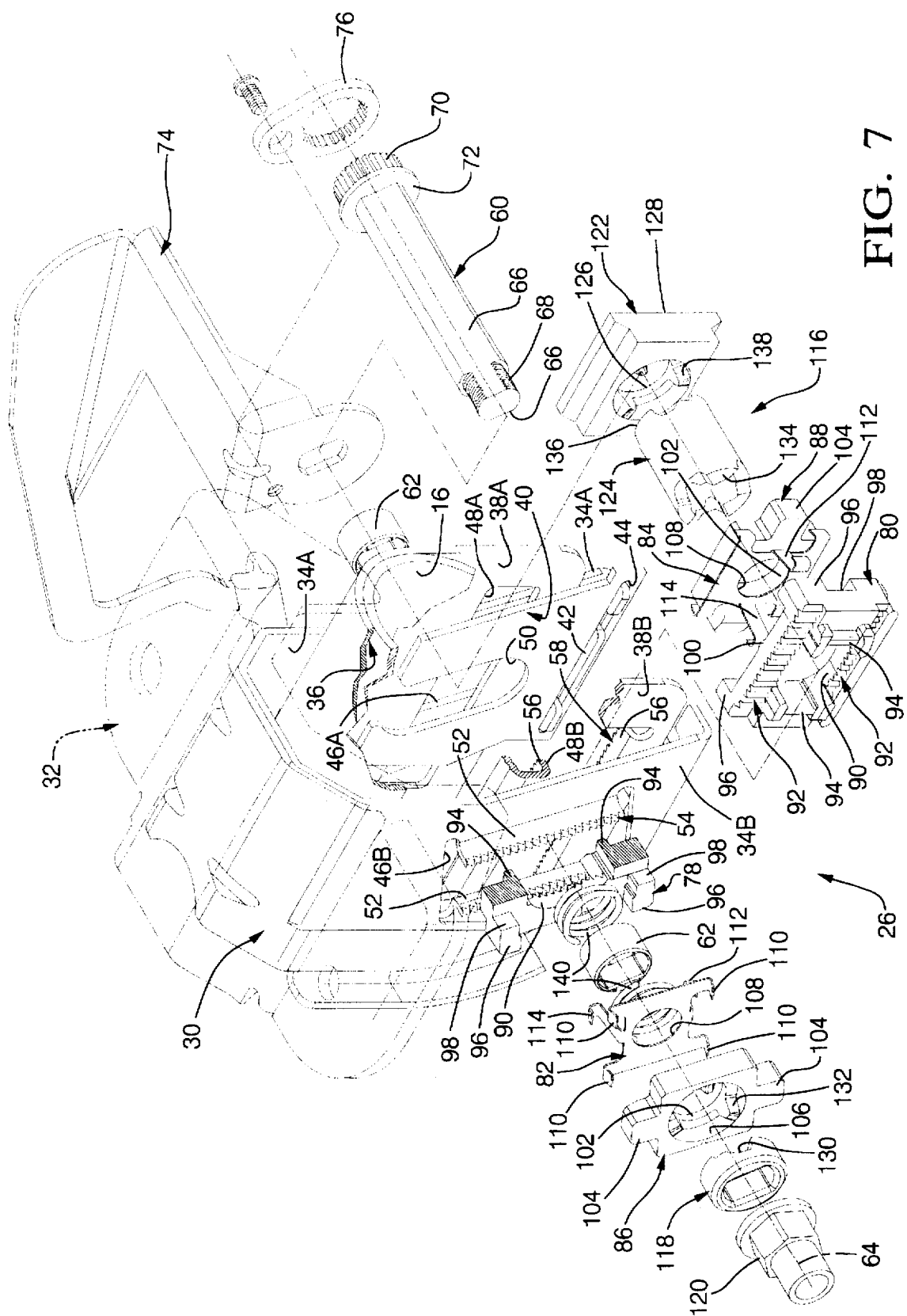

FIG. 2 is an enlarged sectional view taken generally along the plane indicated by lines 2—2 in FIG. 1;

FIG. 3 is a sectional view taken generally along the plane indicated by lines 3—3 in FIG. 2;

FIG. 4 is similar to FIG. 3 showing elements of the position control apparatus according to this invention in different relative positions;

FIG. 5 is an enlarged view taken generally along the plane indicated by lines 5—5 in FIG. 3;

FIG. 6 is an enlarged view taken generally along the plane indicated by lines 6—6 in FIG. 4; and FIG. 7 is an exploded perspective view of the position control apparatus according to this invention.

DESCRIPTION OF THE PREFERRED EMBODIMENT

Referring to FIGS. 1–2, a raked and telescopic motor vehicle steering column 10 includes a mast jacket 12 consisting of a tubular lower mast jacket 14 and a tubular upper mast jacket 16 telescopically overlapping the lower mast jacket. A steering shaft 18 is supported on the mast jacket 12 for rotation about a longitudinal centerline 20 of the latter. A steering wheel 22 is rigidly attached to an upper end of the steering shaft 18 for rotation as a unit therewith.

The mast jacket 12 is pivotable vertically about a geometric center 24 on a body, not shown, of the motor vehicle to adjust the vertical position of the steering wheel 22 between limits represented by upper and lower positions 20', 20" of the centerline 20. The position of the upper mast jacket 16 on the lower mast jacket 14 is variable in the direction of the longitudinal centerline 20 to adjust the horizontal position of the steering wheel 22 between inner and outer limit positions 22', 22". A position control apparatus 26 according to this invention between the upper mast jacket 16 and a schematically represented body structure 28 of the motor vehicle captures the horizontal and vertical positions of the upper mast jacket 16 and, therefore, the horizontal and vertical positions of the steering wheel 22.

As seen best in FIGS. 1, 2 and 7, the position control apparatus 26 includes an outer bracket 30 in the shape of an inverted "U" and a wing-shaped bracket 32 welded to the outer bracket. The outer bracket 30 has a pair of vertical sides 34A, 34B on opposite sides of the upper mast jacket 16. The wing-shaped bracket 32 is rigidly attached to the body structure 28 through hanger bolts and capsules, not shown, which separate from the wing-shaped bracket to permit an energy-absorbing collapse stroke of the steering column 10 in the event of an impact on the steering wheel 22.

An inner bracket 36 of the position control apparatus 26 in the shape of an inverted "U" is disposed inside of the outer bracket 30 and is welded to the upper mast jacket 16. A pair of vertical sides 38A, 38B of the inner bracket are juxtaposed the vertical sides 34A, 34B, respectively, of the outer bracket 30. The vertical side 38A of the inner bracket is sandwiched between the vertical side 34A of the outer bracket and a friction plate 40 attached to the vertical side 34A through a tab 42 on the vertical side 34A in a slot 44 in the friction plate, FIG. 7. The vertical sides 34A, 34B of the outer bracket 30 have respective ones of a pair of substantially vertical slots 46A, 46B therein. The vertical sides 38A, 38B of the inner bracket 36 have a pair of horizontal slots 48A, 48B therein parallel to the longitudinal centerline 20 of the mast jacket. The friction plate 40 has an elongated window 50 therein.

Saw tooth notches on the edges of a pair of integral flanges 52 on the vertical side 34B of the outer bracket on opposite sides of vertical slot 46B define an outer toothed rack 54 of the position control apparatus 26. Saw tooth notches on the edges of a pair of integral flanges 56 on the vertical side 38B of the inner bracket on opposite sides of horizontal slot 48B define an inner toothed rack 58 of the position control apparatus 26.

A cylindrical control shaft 60 of the position control apparatus 26 extends through the vertical and horizontal slots 46A–B, 48A–B where they intersect and through the elongated window 50 in the friction plate 40. During vertical adjustment of the mast jacket 12, the control shaft moves up and down between the ends of the vertical slots 46A, 46B as a unit with the inner bracket 36 and the upper mast jacket 16. During horizontal adjustment of the upper mast jacket 16, the horizontal slots 48A, 48B in the inner bracket 36 move back and forth over the control shaft 60 which is confined in the direction of the longitudinal centerline 20 of the mast jacket by the edges of the vertical slots 46A, 46B.

A pair of plastic spacers 62 on the control shaft 60 center the latter at the intersections of the vertical and horizontal slots 46A–B, 48A–B and thereby cooperate in supporting the control shaft on the inner and the outer brackets 36, 30 for rotation about a lateral centerline 64 of the position control apparatus 26. The control shaft 60 has a pair of flat sides 66 along its full length, a threaded end 68, and a serrated head 70 opposite the threaded end defining an annular shoulder 72 in a plane perpendicular to the lateral centerline 64. A manual control lever 74 is rigidly attached by a retainer 76 to the serrated head 70 for rotation as a unit with the control shaft about the lateral centerline 64 between a locked position and an unlocked position illustrated, respectively, in solid and broken lines in FIG. 1.

As seen best in FIGS. 3, 4 and 7, the position control apparatus 26 further includes an outer rack shoe 78 and an inner rack shoe 80 on the control shaft 60 facing, respectively, the outer toothed rack 54 and the inner toothed rack 58, an outer leaf spring 82 and an inner leaf spring 84 on the control shaft behind, respectively, the outer rack shoe and the inner rack shoe, and an outer cam block 86 and an inner cam block 88 on the control shaft behind, respectively, the outer leaf spring and the inner leaf spring. Each rack shoe 78, 80 has a window 90 around the control shaft, a toothed rack 92 interrupted by the window, a pair of guide bosses 94 at opposite longitudinal ends of the window, a pair of retaining bosses 96 each of which is interrupted by a slot 98, and a pivot boss 100 in the center of the rack shoe perpendicular to the toothed rack 92 interrupted by the window 90. Each cam block 86, 88 includes a circular bore 102 around the control shaft, a pair of lugs 104 at opposite ends of the cam block, and a counterbore 106 around the bore 102. Each leaf spring 82, 84 has a center aperture 108 around the control shaft, a plurality of fingers 110 at the four corners of the spring, and a short hook 112 and a long hook 114 each extending in the opposite direction from the fingers 110.

The fingers 110 of the leaf springs 82, 84 resiliently grip the sides of corresponding ones of the cam blocks 86, 88 to retain the springs and the cam blocks together with the springs flush against the cam blocks. The short and long hooks 112, 114 on the leaf springs 82, 84 are hooked over the guide bosses 94 on corresponding ones of the rack shoes 78, 80 through the widows 90 in the rack shoes. The short hooks 112 rock the corresponding ones of the rack shoes 78, 80 about the pivot bosses 100 on the cam blocks 86, 88 to tilted positions, FIG. 6, defined generally by engagement of the rack shoe on an edge of the cam block. The lugs 104 on the cam blocks cooperate with the slots 98 in the retaining bosses 96 on the rack shoes in preventing relative rotation between the cam blocks and the rack shoes about the lateral centerline 64.

The outer rack shoe 78, the outer leaf spring 82, and the outer cam block 86 constitute an outer clamp jaw of the position control apparatus shiftable in linear translation toward and away from the outer toothed rack 54 in the direction of the lateral centerline 64. The inner rack shoe 80, the inner leaf spring 84, and the inner cam block 88 constitute an inner clamp jaw of the position control apparatus shiftable in linear translation toward and away from the inner toothed rack 58 in the direction of the lateral centerline 64. The control shaft 60 is rotatable relative to the inner and outer clamp jaws about the lateral centerline 64. The guide bosses 94 on the outer rack shoe 78 cooperate with the edges of the vertical slot 46B to prevent rotation of the outer clamp jaw about the lateral centerline 64. Likewise, the guide bosses 94 on the inner rack shoe 80 cooperate with the edges of the horizontal slot 48B to prevent rotation of the inner clamp jaw about the lateral centerline 64.

Each of the inner and the outer clamp jaws has an open position in which the toothed racks 92 on the outer and the inner rack shoes 78, 80 are laterally separated from the outer and inner toothed racks 54, 58, respectively. The open position of only the outer clamp jaw is illustrated in FIG. 6. Each of the outer and the inner clamp jaws has a closed position in which the toothed racks 92 on the outer and the inner rack shoes 78, 80 mesh with the outer and inner toothed racks 54, 58, respectively. The closed position of only the outer clamp jaw is illustrated in FIG. 5. Importantly, in the open positions of the inner and the outer clamp jaws, the toothed racks 92 on the outer and the inner rack shoes 78, 80 define entry angles θ, FIG. 6, relative to the outer and the inner toothed racks 54, 58.

A motion converting means 116 of the position control apparatus 26 converts pivotal movement of the control lever 74 between its locked and unlocked positions into linear translation of the outer and the inner clamp jaws between their closed and open positions, respectively. In addition to the control shaft 60, the motion converting means 116 further includes a short cam cylinder 118 on the control shaft 60 between a nut 120 on the threaded end 68 of the shaft and the outer cam block 86, a compression shoe 122 on the control shaft adjacent the friction plate 40, and a long cam cylinder 124 on the control shaft between the inner cam block 88 and the compression shoe 122. Internal bores in the short cam cylinder 118 and the long cam cylinder 124 shaped like the control shaft 60 connect the short and long cam cylinders to the control shaft for rotation therewith about the lateral centerline 64 and for back and forth linear translation in the direction of the lateral centerline.

A bore 126 through the compression shoe accommodates relative rotation between the control shaft and the compression block. A flat side 128 of the compression shoe 122 faces the friction plate 40 and a pair of guide lugs on the flat side 128 protrude through the elongated window 50 in the friction plate into the horizontal slot 48A in the vertical side 38A of the inner bracket 36. The guide lugs cooperate with the edges of the horizontal slot in preventing rotation of the compression shoe about the lateral centerline 64.

As seen best in FIG. 7, an annular cam 130 on an end of the short cam cylinder 118 faces a plurality of cam followers 132 in a counterbore around the bore 102 in the outer cam block 86. An annular cam 134 on one end of the long cam cylinder 124 faces a plurality of cam followers, not shown, in a counterbore in the inner cam block 88 like the cam followers 132 on the outer cam block. An annular cam 136 on the other end of the long cam cylinder 124 faces a plurality of cam followers 138 in a counterbore in the compression shoe 122 around the bore 126 in the latter. A pair of coil springs 140 around the control shaft 60 on opposite sides of one of the spacers 62 bear against the outer and the inner leaf springs 82, 84, respectively, and thereby bias each of the outer and the inner clamp jaws toward their open positions. In addition, the springs 140 maintain contact between the annular cams 130, 134, 136 and the corresponding cam followers on the cam blocks and on the compression shoe.

When the control lever 74 is in its unlocked position, the cam followers on the cam blocks 86, 88 and on the compression shoe 122 are aligned with the deepest segments of the annular cams 130, 134, 136 and the inner and the outer clamp jaws assume their open positions, FIGS. 4 and 6, by virtue of the bias of the springs 140. In the open positions of the inner and outer clamp jaws, the toothed racks on the outer and the inner rack shoes 78, 80 are remote from the outer and the inner toothed racks 54, 58, respectively, so that the mast jacket 12 is freely adjustable vertically and horizontally. Also, as described above, each of the toothed racks 92 on the inner and the outer rack shoes defines the entry angle θ relative to the corresponding one of the inner and the outer toothed racks 58, 54.

To capture concurrently the horizontal and vertical adjusted positions of the mast jacket 12, an operator manually pivots the control lever 74 from its unlocked position to its locked position. Corresponding rotation of the control shaft 60 and the cam cylinders 118, 124 thereon is converted by the annular cams 130, 134, 136 and the corresponding cam followers into linear translation of the inner and the outer clamp jaws toward the outer and the inner toothed racks 54, 58. Because of the entry angle θ, initial engagement between the toothed rack 92 on the outer rack shoe 78 and the outer toothed rack 54 is at an end tooth 142 of the former and a mating tooth 144 of the latter. Thereafter, concurrent with continued linear translation of the outer clamp jaw to its closed position, the reaction force of the mating tooth 144 on the end tooth 142 rocks or pivots the outer rack shoe 78 about raised boss 100 on the outer cam block 86 against a restoring force induced by the outer leaf spring 82 until the outer rack shoe 78 is parallel with the outer toothed rack 54 and the toothed rack 92 on the rack shoe meshes fully with the outer toothed rack. The toothed rack 92 on the inner rack shoe 80 and the inner toothed rack 58 cooperate concurrently and identically to achieve full mesh in the locked position of the control lever 74.

Rotation of the cam cylinders 118, 124 relative to the cam blocks 86, 88 and to the compression shoe 122 also clamps together the side 128 of the compression shoe and the flange 72 on the head 70 of the control shaft 60 on opposite sides of the juxtaposed stack consisting of the vertical sides 34A, 38A of the outer and inner brackets 30, 36 and the friction plate 40. Friction induced between the vertical sides 34A, 38A and between the vertical side 38A of the inner bracket and the friction plate 40 supplements the capture function of the aforesaid inner and outer clamp jaws with respect to the horizontal and vertical adjusted positions of the mast jacket 12.

Referring to FIGS. 3–6, the entry angle θ between the toothed rack 92 on the outer rack shoe 78 and the outer toothed rack 54 and between the toothed rack 92 on the inner rack shoe 80 and the inner toothed rack 58 assures smooth meshing of the toothed racks regardless of the relative positions of the toothed racks. When, for example, the relative positions of the toothed racks 54, 92 effects peak-to-peak engagement between the end tooth 142 of the toothed rack 92 on the outer rack shoe and the mating tooth 144 of the outer toothed rack 54 as the control lever 74 is pivoted from its unlocked to its locked position, the aforesaid pivotal movement of the rack shoe 78 about the lateral pivot boss 100 induced by the reaction force of the mating tooth on the end tooth displaces a peak 146 of the end tooth 142 relative to the peak of the mating tooth in the direction of the toothed racks 54, 92. Such displacement shifts the peak 146 of the end tooth 142 to a flank of the mating tooth, thereby aligning the toothed racks 54, 92 relative to each other for smooth mesh concurrent with the rack shoe 78 achieving parallelism with the outer toothed rack 54.

I claim:

1. A position control apparatus for a motor vehicle steering column having a mast jacket adjustable relative to a body of said motor vehicle through a range of adjusted positions including a pair of brackets connected to respective ones of said body of said motor vehicle and said steering column mast jacket having a pair of juxtaposed sides slideable relative to each other concurrent with adjustment of said mast jacket through said range of adjusted positions, a control shaft protruding through an opening in each of said juxtaposed sides of said brackets such that one of said juxtaposed sides moves relative to said control shaft in a plane perpendicular to said control shaft concurrent with adjustment of said mast jacket through said range of adjusted positions, a first toothed rack on said one of said juxtaposed sides, and a clamp jaw supported on said control shaft for linear translation toward and away from said first toothed rack between a locked position in which a second toothed rack on said clamp jaw meshes with said first toothed rack on said one of said juxtaposed sides and an unlocked position in which said second toothed rack is remote from said first toothed rack, characterized in that said clamp jaw comprises:

a cam block supported on said control shaft for linear translation toward and away from said first toothed rack, a pivot boss means on said cam block, a rack shoe supported on said control shaft for linear translation toward and away from said first toothed rack as a unit with said cam block and for pivotal movement relative to said cam block about said pivot boss, said second toothed rack being formed on said rack shoe, and a spring means between said rack shoe and said cam block operative to bias said rack shoe to a tilted position relative to said first toothed rack in said unlocked position of said clamp jaw so that, concurrent with linear translation of said clamp jaw from said unlocked position to said locked position, an end tooth of said second toothed rack is first to engage a mating tooth on said first toothed rack and a corresponding reaction force of said mating tooth on said end tooth pivots said rack shoe to a position parallel to said first toothed rack in which said first and said second toothed racks mesh without peak to peak interference.

2. The position control apparatus recited in claim 1 further comprising:
   a control lever rotatable as a unit with said control shaft, and
   a motion converting means operative to convert rotation of said control shaft into linear translation of said clamp jaw from said locked position to said unlocked position including
      an annular cam rotatable as a unit with said control shaft, and
      a cam follower on said cam block engageable on said annular cam.

3. The position control apparatus recited in claim 2 wherein said spring means between said rack shoe and said cam block comprises:
   a flat leaf spring,
   a plurality of fingers on said flat leaf spring resiliently gripping said cam block to couple together said flat leaf spring and said cam block, and
   a pair of hooks on said flat leaf spring gripping said rack shoe and rocking said rack shoe about said pivot boss on said cam block to said tilted position of said rack shoe.

* * * * *